(12) United States Patent
Rahman et al.

(10) Patent No.: US 11,444,756 B2
(45) Date of Patent: Sep. 13, 2022

(54) QUANTUM KEY DISTRIBUTION NETWORK SECURITY SURVIVABILITY

(71) Applicant: AT&T Intellectual Property I, L.P., Atlanta, GA (US)

(72) Inventors: Moshiur Rahman, Marlboro, NJ (US); William Trost, Mequon, WI (US); Daniel Solero, Rockwall, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/953,401

(22) Filed: Nov. 20, 2020

(65) Prior Publication Data

US 2022/0166610 A1 May 26, 2022

(51) Int. Cl.
| | |
|---|---|
| *H04L 9/08* | (2006.01) |
| *H04L 29/06* | (2006.01) |
| *H04L 69/329* | (2022.01) |
| *H04L 45/28* | (2022.01) |
| *H04L 41/0668* | (2022.01) |

(52) U.S. Cl.
CPC ........ *H04L 9/0852* (2013.01); *H04L 41/0668* (2013.01); *H04L 45/28* (2013.01); *H04L 69/329* (2013.01)

(58) Field of Classification Search
CPC . H04L 9/0852; H04L 9/0855; H04L 41/0668; H04L 45/28; H04L 69/329; H04L 69/40
See application file for complete search history.

(56) References Cited

U.S. PATENT DOCUMENTS

| | | | | |
|---|---|---|---|---|
| 7,646,873 | B2* | 1/2010 | Lee | H04L 9/0852 380/277 |
| 8,170,214 | B2* | 5/2012 | Harrison | H04B 10/70 380/278 |
| 8,213,616 | B2* | 7/2012 | Bloch | H04K 1/02 380/268 |
| 10,200,504 | B2* | 2/2019 | Decenzo | H04N 7/18 |
| 10,275,999 | B2* | 4/2019 | Cohn | H04L 12/2834 |
| 10,623,180 | B2* | 4/2020 | Tanizawa | H04L 9/3213 |
| 2005/0286723 | A1* | 12/2005 | Vig | H04L 9/0855 380/278 |
| 2014/0098955 | A1* | 4/2014 | Hughes | H04L 9/0852 380/256 |

* cited by examiner

*Primary Examiner* — Hosuk Song
(74) *Attorney, Agent, or Firm* — Hartman & Citrin LLC

(57) ABSTRACT

Quantum key distribution network security survivability can be provided by receiving, at a software defined networking controller operating in a control layer of a network, a recommendation from a global analytics service operating in an application layer of the network, the recommendation for replacing a failed communication link in a quantum key distribution layer of the network, the failed communication link being detected by a quantum edge computing device operating in the quantum key distribution layer. The software defined networking controller can generate a command to cause a quantum key distribution resource to perform an action to mitigate impact from the failed communication link. The command can be sent to the quantum key distribution resource and the quantum key distribution resource can perform the action to mitigate the impact from the failed communication link.

20 Claims, 12 Drawing Sheets

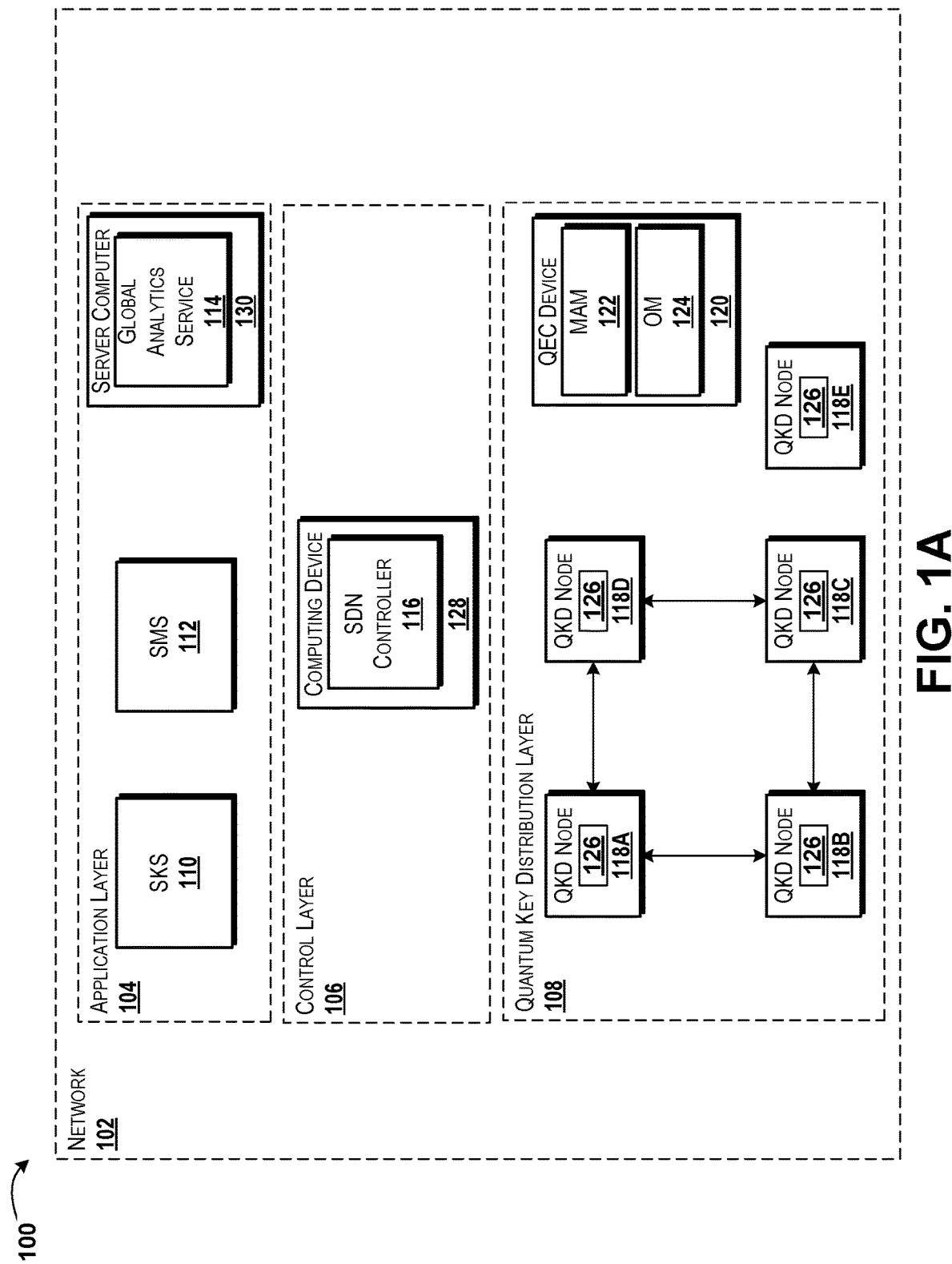

QUANTUM KEY DISTRIBUTION NETWORK SECURITY SURVIVABILITY

BACKGROUND

In quantum key distribution networks, quantum key distribution links can exist for the distribution and management of secret keys and/or other information. Such keys may be used to enable communications between quantum key distribution resources. As such, survivability of network security in quantum key distribution networks can be important.

Generally, the secret key provisioning services in quantum key distribution networks can satisfy security demands of users. In the event of a communication link failure of quantum key distribution infrastructure (e.g., optical fiber network), however, services may be interrupted. Such failures can reduce capacity and/or data flow, and therefore can negatively impact quality of experience for customers and/or other users.

SUMMARY

The present disclosure is directed to quantum key distribution network security survivability. A quantum key distribution network can be provided by quantum key distribution resources of a quantum key distribution layer of a network. The quantum key distribution resources can include two or more quantum key distribution nodes, communication links between the two or more quantum key distribution nodes, and a quantum edge computing device. The quantum edge computing device can execute and/or host a monitoring and analysis module and an orchestration module. The quantum edge computing device can be configured to detect a failure of a communication link, for example a quantum key distribution communication link between two quantum key distribution nodes. In response to detecting the failure of the communication link, the quantum edge computing device can obtain or generate, and analyze, failure data and one or more data sets that can describe failure and security statuses of the quantum key distribution resources of the quantum key distribution layer. The quantum edge computing device can generate analysis results and share the analysis results with a global analytics service.

The global analytics service can analyze global data (e.g., security policies, key distribution policies, quantum key distribution communication needs, etc.) and generate a recommendation for mitigating the communication link failure. The global analytics service can send the recommendation to a software defined networking controller for additional analysis and/or action. The software defined networking controller can have a global view of the network and/or resources thereof. The software defined networking controller can determine how to mitigate the communication link failure, and generate one or more commands for mitigating the communication link failure. The software defined networking controller can send the one or more commands to one or more of the quantum key distribution resources of the quantum key distribution layer such as, for example, the quantum key distribution nodes and/or the quantum edge computing device.

The quantum key distribution resources of the quantum key distribution layer such as, for example, the quantum key distribution nodes and/or the quantum edge computing device, can implement the commands to mitigate the communication link failure. If the recipient of the command is the quantum edge computing device, the quantum edge computing device can allocate existing quantum key distribution resources to replace the failed communication link, instruct quantum key distribution resources to reroute traffic, and/or take other actions via the orchestration module. If the recipient of the command is one or more quantum key distribution nodes, the one or more quantum key distribution nodes can reroute traffic as specified in the commands. Thus, a closed loop that includes the quantum edge computing device, the global analytics service, and the software defined networking controller, can be provided to mitigate a failed communication link in a quantum key distribution layer of the network.

According to one aspect of the concepts and technologies disclosed herein, a system is disclosed. The system can include a processor and a memory. The memory can store computer-executable instructions that, when executed by the processor, cause the processor to perform operations. The operations can include receiving, at a software defined networking controller operating in a control layer of a network, a recommendation from a global analytics service operating in an application layer of the network. The recommendation can recommend replacing a failed communication link in a quantum key distribution layer of the network. The failed communication link can be detected by a quantum edge computing device operating in the quantum key distribution layer. The operations further can include generating, by the software defined networking controller and based on the recommendation and a network topology, a command that, when received by a quantum key distribution resource of the quantum key distribution layer, causes the quantum key distribution resource to perform an action to mitigate impact from the failed communication link. The operations also can include sending, to the quantum key distribution resource, the command. The quantum key distribution resource can perform the action to mitigate the impact from the failed communication link.

In some embodiments, a closed loop to enable mitigation of the impact from the failed communication link can include the software defined networking controller, the quantum edge computing device, and the global analytics service. In some embodiments, the failed communication link can include a communication link between a first quantum key distribution node and a second quantum key distribution node. In some embodiments, the quantum key distribution resource can include the quantum edge computing device, and the action to mitigate the impact from the failed communication link can include allocating a new communication link between the first quantum key distribution node and the second quantum key distribution node.

In some embodiments, the quantum key distribution resource can include the first quantum key distribution node, and the action to mitigate the impact from the failed communication link can include rerouting traffic from the failed communication link to a new communication link between the first quantum key distribution node and the second quantum key distribution node. In some embodiments, the new communication link can include a satellite link. In some embodiments, the recommendation can be generated by the global analytics service based on local analysis results generated by the quantum edge computing device. The quantum edge computing device can operate at an edge of the quantum key distribution layer and can access a data set that can describe failures and security status of quantum key distribution resources of the quantum key distribution layer.

In some embodiments, the system also can include a first direct interface between the quantum edge computing device and the software defined networking controller; and a second direct interface between the global analytics service and the software defined networking controller. A closed loop to enable mitigation of the impact from the failed communication link can be provided by the software defined networking controller, the first direct interface, the quantum edge computing device, the second direct interface, and the global analytics service.

According to another aspect of the concepts and technologies disclosed herein, a method is disclosed. The method can include receiving, at a software defined networking controller operating in a control layer of a network, a recommendation from a global analytics service operating in an application layer of the network. The recommendation can recommend replacing a failed communication link in a quantum key distribution layer of the network. The failed communication link can be detected by a quantum edge computing device operating in the quantum key distribution layer. The method further can include generating, by the software defined networking controller and based on the recommendation and a network topology, a command that, when received by a quantum key distribution resource of the quantum key distribution layer, causes the quantum key distribution resource to perform an action to mitigate impact from the failed communication link. The method also can include sending, to the quantum key distribution resource, the command. The quantum key distribution resource can perform the action to mitigate the impact from the failed communication link.

In some embodiments, the failed communication link can include a communication link between a first quantum key distribution node and a second quantum key distribution node. In some embodiments, the quantum key distribution resource can include the quantum edge computing device, and the action to mitigate the impact from the failed communication link can include allocating a new communication link between the first quantum key distribution node and the second quantum key distribution node. In some embodiments, the quantum key distribution resource can include the first quantum key distribution node, and the action to mitigate the impact from the failed communication link can include rerouting traffic from the failed communication link to a new communication link between the first quantum key distribution node and the second quantum key distribution node. In some embodiments, the recommendation can be generated by the global analytics service based on local analysis results generated by the quantum edge computing device. The quantum edge computing device can operate at an edge of the quantum key distribution layer and can access a data set that can describe failures and security status of quantum key distribution resources of the quantum key distribution layer.

In some embodiments, a closed loop to enable mitigation of the impact from the failed communication link can include the quantum edge computing device, a first interface between the quantum edge computing device and the global analytics service, a second interface between the global analytics service and the software defined networking controller, and a third interface between the software defined networking controller and the quantum edge computing device. The second interface can include a first direct interface, and the third interface can include a second direct interface. In some embodiments, the recommendation can be generated by the global analytics service based on local analysis results generated by the quantum edge computing device. The quantum edge computing device can operate at an edge of the quantum key distribution layer and can access a data set that can describe failures and security status of quantum key distribution resources of the quantum key distribution layer.

According to yet another aspect of the concepts and technologies disclosed herein, a computer storage medium is disclosed. The computer storage medium can store computer-executable instructions that, when executed by a processor, cause the processor to perform operations. The operations can include receiving, at a software defined networking controller operating in a control layer of a network, a recommendation from a global analytics service operating in an application layer of the network. The recommendation can recommend replacing a failed communication link in a quantum key distribution layer of the network. The failed communication link can be detected by a quantum edge computing device operating in the quantum key distribution layer. The operations further can include generating, by the software defined networking controller and based on the recommendation and a network topology, a command that, when received by a quantum key distribution resource of the quantum key distribution layer, causes the quantum key distribution resource to perform an action to mitigate impact from the failed communication link. The operations also can include sending, to the quantum key distribution resource, the command. The quantum key distribution resource can perform the action to mitigate the impact from the failed communication link.

In some embodiments, a closed loop to enable mitigation of the impact from the failed communication link can include the software defined networking controller, the quantum edge computing device, and the global analytics service. In some embodiments, the failed communication link can include a communication link between a first quantum key distribution node and a second quantum key distribution node. The quantum key distribution resource can include the quantum edge computing device, and the action to mitigate the impact from the failed communication link can include allocating a new communication link between the first quantum key distribution node and the second quantum key distribution node.

In some embodiments, the failed communication link can include a communication link between a first quantum key distribution node and a second quantum key distribution node. The quantum key distribution resource can include the first quantum key distribution node, and the action to mitigate the impact from the failed communication link can include rerouting traffic from the failed communication link to a new communication link between the first quantum key distribution node and the second quantum key distribution node. In some embodiments, a closed loop to enable mitigation of the impact from the failed communication link can include the quantum edge computing device, a first interface between the quantum edge computing device and the global analytics service, a second interface between the global analytics service and the software defined networking controller, and a third interface between the software defined networking controller and the quantum edge computing device. The second interface can include a first direct interface, and the third interface can include a second direct interface.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

BRIEF DESCRIPTION OF THE DRAWINGS

FIGS. 1A-1D are system diagrams illustrating an illustrative operating environment for various embodiments of the concepts and technologies described herein.

DETAILED DESCRIPTION

Figure 1B:
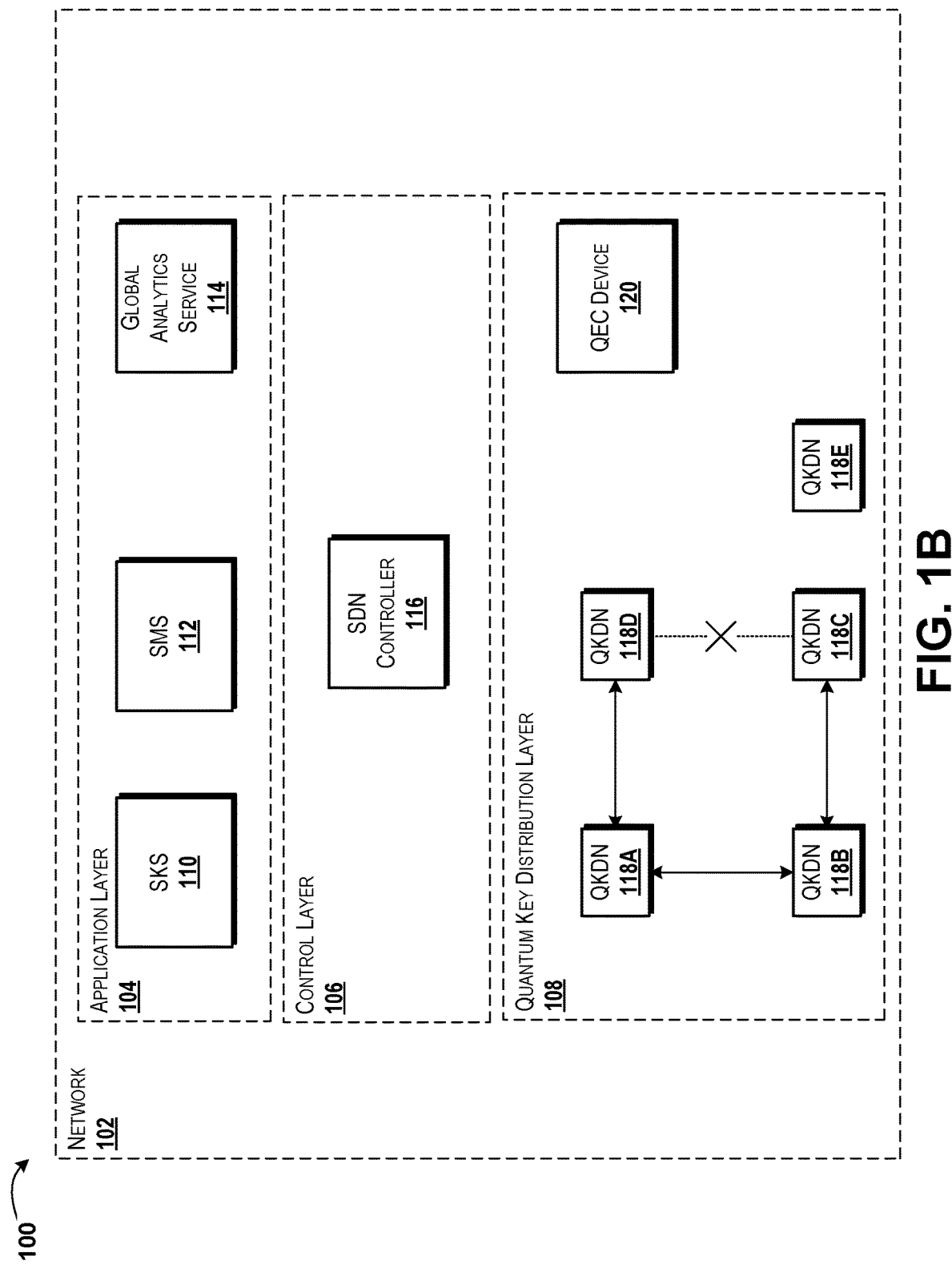

The following detailed description is directed to quantum key distribution network security survivability. A quantum key distribution network can be provided by quantum key distribution resources of a quantum key distribution layer of a network. The quantum key distribution resources can include two or more quantum key distribution nodes, communication links between the two or more quantum key distribution nodes, and a quantum edge computing device. The quantum edge computing device can execute and/or host a monitoring and analysis module and an orchestration module. The quantum edge computing device can be configured to detect a failure of a communication link, for example a quantum key distribution communication link between two quantum key distribution nodes. In response to detecting the failure of the communication link, the quantum edge computing device can obtain or generate, and analyze, failure data and one or more data sets that can describe failure and security statuses of the quantum key distribution resources of the quantum key distribution layer. The quantum edge computing device can generate analysis results and share the analysis results with a global analytics service.

The global analytics service can analyze global data (e.g., security policies, key distribution policies, quantum key distribution communication needs, etc.) and generate a recommendation for mitigating the communication link failure. The global analytics service can send the recommendation to a software defined networking controller for additional analysis and/or action. The software defined networking controller can have a global view of the network and/or resources thereof. The software defined networking controller can determine how to mitigate the communication link failure, and generate one or more commands for mitigating the communication link failure. The software defined networking controller can send the one or more commands to one or more of the quantum key distribution resources of the quantum key distribution layer such as, for example, the quantum key distribution nodes and/or the quantum edge computing device.

The quantum key distribution resources of the quantum key distribution layer such as, for example, the quantum key distribution nodes and/or the quantum edge computing device, can implement the commands to mitigate the communication link failure. If the recipient of the command is the quantum edge computing device, the quantum edge computing device can allocate existing quantum key distribution resources to replace the failed communication link, instruct quantum key distribution resources to reroute traffic, and/or take other actions via the orchestration module. If the recipient of the command is one or more quantum key distribution nodes, the one or more quantum key distribution nodes can reroute traffic as specified in the commands. Thus, a closed loop that includes the quantum edge computing device, the global analytics service, and the software defined networking controller, can be provided to mitigate a failed communication link in a quantum key distribution layer of the network.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIGS. 1A-1D, aspects of an operating environment 100 for various embodiments of the concepts and technologies disclosed herein for quantum key distribution network security survivability will be described, according to an illustrative embodiment. The operating environment 100 shown in FIG. 1 can include a network 102. The network 102 can include multiple devices and/or entities, which can be arranged, in some embodiments, in a number of layers. In the illustrated embodiment shown in FIGS. 1A-1D, the network 102 includes an application layer 104, a control layer 106, and a quantum key distribution layer 108. Other layers are possible and are contemplated. As such, it should be understood that this example is illustrative, and therefore should not be construed as being limiting in any way.

The application layer 104 can be considered, in various embodiments of the concepts and technologies disclosed herein, as being the "top" layer of the network 102. As such, the application layer 104 can have southbound interfaces including a southbound interface to the control layer 106 and/or a southbound interface to the quantum key distribution layer 108. These southbound interfaces are not separately labeled in FIGS. 1A-1D, though communications via these interfaces are illustrated and described in more detail hereinbelow. In some embodiments, one or more components of the application layer 104 can have a direct interface and/or direct connection (e.g., a dedicated communication link, a direct interface, an in-band communication link, an out-of-band communication link, combinations thereof, or the like) between one or more elements of one or more of the other layers of the network 102. These and other features of the network 102 will be illustrated and described in more detail below after introducing the remaining components of the operating environment 100.

In various embodiments of the concepts and technologies disclosed herein, the application layer 104 can be what users and/or other entities may term the "customer-facing" layer of the network 102. In particular, the application layer 104 can directly face demands of users and also can control and/or manage network resources for users. Thus, for example, the application layer 104 may provide topological visualization, quality of service management, and/or other features for users. Because the application layer 104 of a network 102 is generally understood, these and other features of the application layer 104 are not described in additional detail here.

In the illustrated embodiment of the application layer 104, several components are illustrated. While other components are possible, and are contemplated, only the components of the application layer 104 used to provide functionality as illustrated and described herein for quantum key distribution network security survivability will be discussed here. As shown in FIGS. 1A-1D, the application layer 104 includes a secret key provisioning service 110 (labeled "SKS 110" in FIGS. 1A-1D), a security management service 112 (labeled "SMS 112" in FIGS. 1A-1D), and a global analytics service 114. It should be understood that this example is illustrative, and therefore should not be construed as being limiting in any way.

According to some embodiments of the concepts and technologies disclosed herein, the global analytics service 114 can communicate directly with a software defined networking controller 116 in the control layer 106. In some embodiments, the global analytics service 114 can maintain a direct interface to the software defined networking controller 116, though this is not necessarily the case. The software defined networking controller can be configured to enable abstraction of network resources across the network 102 by communication with the global analytics service 114 via a northbound interface. Thus, the software defined networking controller 116 can be configured to enable abstraction of light-path building for quantum key distribution and routing for secret key generation occurring in the quantum key distribution layer 108. It should be understood that this example is illustrative, and therefore should not be construed as being limiting in any way.

Thus, unlike some traditional optical networks, the application layer 104 can include three major services, the secret key provisioning service 110, the security management service 112, and the global analytics service 114. The secret key provisioning service 110 can be configured to provide secret keys for the security demands of the network 102 including, but not limited to, authentication, encryption, signature, and/or other security demands. Information relating to secret key provisioning can be provided to the global analytics service 114, as will be explained in more detail below.

The security management service 112 can be configured to provide security functions for the network 102 such as, for example, intrusion detection, virus protection, security posture sensing, and the like. Thus, the security management service 112 can be configured to provide a thorough view of security needs and/or security state of the network 102, including the quantum key distribution layer 108. This information can be provided to the global analytics service 114, as will be explained in more detail below.

The global analytics service 114 can be configured to provide data analysis for the network 102. This data analysis can be performed in realtime, near-realtime, and/or offline. The global analytics service 114 can be configured to generate policies for failure detection and prevention, and to implement these policies, for example by performing the operations illustrated and described herein for providing quantum key distribution network security survivability. It should be understood that this example is illustrative, and therefore should not be construed as being limiting in any way.

The control layer 106 can include devices or other entities that can be configured to provide a holistic view of quantum key distribution networks (such as the quantum key distribution network depicted in the quantum key distribution layer 108 of FIGS. 1A-1D, as will be explained in more detail below). The control layer 106 may include one or more software defined networking controller 116. The software defined networking controller 116 can be configured to implement network management over the quantum key distribution layer 108. The software defined networking controller 116 also can be configured to provide open network capabilities for various applications. According to various implementations of the operating environment 100, various numbers of software defined networking controllers 116 can operate in the control layer 106 and can be configured to support hierarchical structure and multiple domains to improve the scalability of the network 102. It should be understood that this example is illustrative, and therefore should not be construed as being limiting in any way.

The quantum key distribution layer 108 illustrated in FIGS. 1A-1D can be implemented as a separate key distribution subsystem of the network 102. In the illustrated embodiment, the quantum key distribution layer 108 can include two or more quantum key distribution nodes 118A-E (hereinafter collectively and/or generically referred to as "quantum key distribution nodes 118") and a quantum edge computing device 120. The quantum edge computing device 120 is a new node introduced to the quantum key distribution layer 108 by embodiments of the concepts and technologies disclosed herein. According to various embodiments of the concepts and technologies disclosed herein, the quantum key distribution nodes 118, the quantum edge computing device 120, and communications links between these devices may sometimes be referred to as a "quantum key distribution network."

According to various embodiments, the functionality of the quantum edge computing device 120 may be provided by one or more server computers, desktop computers, laptop computers, other computing systems, and the like. It should be understood that the functionality of the quantum edge computing device 120 can be provided by a single device, by two or more similar devices, and/or by two or more dissimilar devices. For purposes of describing the concepts and technologies disclosed herein, the quantum edge computing device 120 is described herein as a server computer. It should be understood that this embodiment is illustrative, and should not be construed as being limiting in any way.

According to various embodiments of the concepts and technologies disclosed herein, the quantum edge computing device 120 can execute an operating system (not labeled in FIGS. 1A-1D). The operating system can include a computer program for controlling the operation of the quantum edge computing device 120. The quantum edge computing device 120 also can host and/or execute one or more executable programs that can be configured to execute on top of the operating system to provide various functions as described herein.

In particular, the quantum edge computing device 120 can include, host, and/or execute a monitoring and analysis module 122 (labeled "MAM 122" in FIG. 1A). The quantum edge computing device 120 also can include, host, and/or execute an orchestration module 124 (labeled "OM 124" in FIG. 1A). The quantum edge computing device 120 can be configured (e.g., via execution of the monitoring and analysis module 122 and/or the orchestration module 124) to support edge computing and to obtain and/or generate surveillance statistics. The quantum edge computing device 120 can perform these and/or other operations in compliance with simple network management protocol ("SNMP").

The quantum edge computing device 120 can provide edge computing capabilities for the quantum key distribution layer 108, as will be explained in more detail herein. In some embodiments, the quantum edge computing device 120 can have a direct interface with the software defined networking controller 116 and/or with the global analytics service 114. According to various embodiments of the concepts and technologies disclosed herein, the quantum edge computing device 120, the software defined networking controller 116, and the global analytics service 114 can cooperate to provide a closed loop for addressing communication link failures in the quantum key distribution layer 108, as will be explained in more detail herein.

The quantum key distribution layer 108 is illustrated in FIGS. 1A-1D as being at the "bottom" of the architecture of the network 102. The quantum key distribution layer 108 can monitor, control, and allocate quantum key distribution devices, quantum key distribution communication links, and/or other quantum key distribution resources in the quantum key distribution layer 108. According to various embodiments of the concepts and technologies disclosed herein, the quantum key distribution resources over which the quantum edge computing device 120 can maintain monitoring and control capabilities can include, but are not limited to, communication links between quantum key distribution nodes 118 (e.g., wavelength division multiplexing communication links), as well as the quantum key distribution nodes 118 themselves. The quantum key distribution nodes 118 and the communication links between the quantum key distribution nodes 118 can be used to provide point-to-point quantum key distribution and end-to-end quantum key distribution.

Although not illustrated separately in FIGS. 1A-1D, it should be understood that the quantum key distribution nodes 118 can include quantum transmitters ("QTs"), quantum receivers ("QRs"), quantum key pools ("QKPs") and trust repeaters ("TRs"). As is generally understood, the quantum transmitters can be used for preparing quantum signals according to different quantum key distribution protocols such as the BB84 protocol and/or other protocols. The quantum receivers can be responsible for detecting quantum signals at receiver ends, and performing quantum state decoding and single-photon detection according to the quantum key distribution protocol.

The quantum key pools can be used for the storage of secret keys between any two adjacent quantum key distribution nodes 118 to satisfy security demands, and each quantum key distribution node 118 can have, in various embodiments, its own quantum key pool. According to various embodiments of the concepts and technologies disclosed herein, the quantum edge computing device 120 can be configured (e.g., via execution of the monitoring and analysis module 122 and/or the orchestration module 124) to control and/or allocate these and/or other quantum key distribution resources. In some embodiments, each quantum key distribution node 118 can also include a control application 126, which can correspond to logic and/or a software module for responding to signals and/or commands issued by the quantum edge computing device 120 and/or the software defined networking controller 116, as will be explained in more detail hereinbelow.

According to various embodiments of the concepts and technologies disclosed herein, the components of the quantum key distribution layer 108 (e.g., the quantum key distribution nodes and the quantum edge computing device 120) can maintain direct interfaces with the software defined networking controller 116, thereby enabling the software defined networking controller 116 to control the quantum key distribution resources (e.g., the quantum key distribution nodes and the quantum edge computing device 120). It should be understood that this example is illustrative, and therefore should not be construed as being limiting in any way.

Similarly, the quantum key distribution resources of the quantum key distribution layer 108 (e.g., the quantum key distribution nodes and the quantum edge computing device 120) can be monitored by the global analytics service 114, which can also recommend actions to the software defined networking controller 116, as will be illustrated and described in more detail hereinbelow. Thus, it can be appreciated that a closed loop for monitoring, analysis, control, and/or management of the quantum key distribution layer 108 can be enabled by the quantum edge computing device 120, the software defined networking controller 116, and the global analytics service 114. It should be understood that this example is illustrative, and therefore should not be construed as being limiting in any way.

Furthermore, the application layer 104 can be configured to generate quantum key distribution surveillance policy for the quantum key distribution layer 108. In particular, the secret key provisioning service 110 and the security management service 112 can send secret keys and/or quantum key distribution policies to the software defined networking controller 116 (e.g., using transmission control protocol ("TCP") or the like) via any secure interfaces. The application layer 104 also can be configured to receive demands from operators and/or other entities (e.g., new quantum key distribution communication links, etc.), to generate requests, and to send such requests to the software defined networking controller 116 through an interface with the software defined networking controller 116. The software defined networking controller 116 can be configured to identify and allocate quantum key distribution resources using data received from the global analytics service 114 and using a global network map that can be maintained by the software defined networking controller 116 to satisfy the requests to the extent possible. As such, it can be appreciated that the software defined networking controller 116 can control the quantum key distribution resources of the quantum key distribution layer 108, provide services for multiple applications in the application layer 104, and/or receive resource allocation and policy information of the quantum key distribution layer 108. These and other features of the concepts and technologies disclosed herein will be illustrated and described in more detail below.

According to various embodiments of the concepts and technologies disclosed herein, the software defined networking controller 116 can be hosted and/or executed by a computing device 128. The functionality of the computing device 128 may be provided by one or more server computers, desktop computers, laptop computers, other computing systems, and the like. It should be understood that the functionality of the computing device 128 can be provided by a single device, by two or more similar devices, and/or by two or more dissimilar devices. For purposes of describing the concepts and technologies disclosed herein, the computing device 128 is described herein as a server computer. It should be understood that this embodiment is illustrative, and should not be construed as being limiting in any way.

According to various embodiments of the concepts and technologies disclosed herein, the global analytics service 114 can be hosted and/or executed by a server computer 130. The functionality of the server computer 130 may be provided by one or more server computers, desktop computers, laptop computers, other computing systems, and the like. It should be understood that the functionality of the server computer 130 can be provided by a single device, by two or more similar devices, and/or by two or more dissimilar devices. For purposes of describing the concepts and technologies disclosed herein, the server computer 130 is described herein as a server computer. It should be understood that this embodiment is illustrative, and should not be construed as being limiting in any way.

Now that the elements of the operating environment 100 have been introduced, additional details of the operating environment 100 will now be described with reference to FIGS. 1A-1D. As shown in FIG. 1B, at some point in time, a communication link between two quantum key distribution nodes 118 can fail. In the embodiment shown in FIG. 1B, the communication link between the quantum key distribution nodes 118C and 118D can fail. According to various embodiments of the concepts and technologies disclosed herein, the "communication links" described herein as existing or failing between two or more quantum key distribution nodes 118 should be understood as being quantum key distribution network communication links, and therefore should be understood as including quantum key distribution resources that can be configured to enable communication between the two or more quantum key distribution nodes 118 (e.g., quantum transmitters, quantum receivers, etc.). It should be understood that this example is illustrative, and therefore should not be construed as being limiting in any way.

Figure 1C:
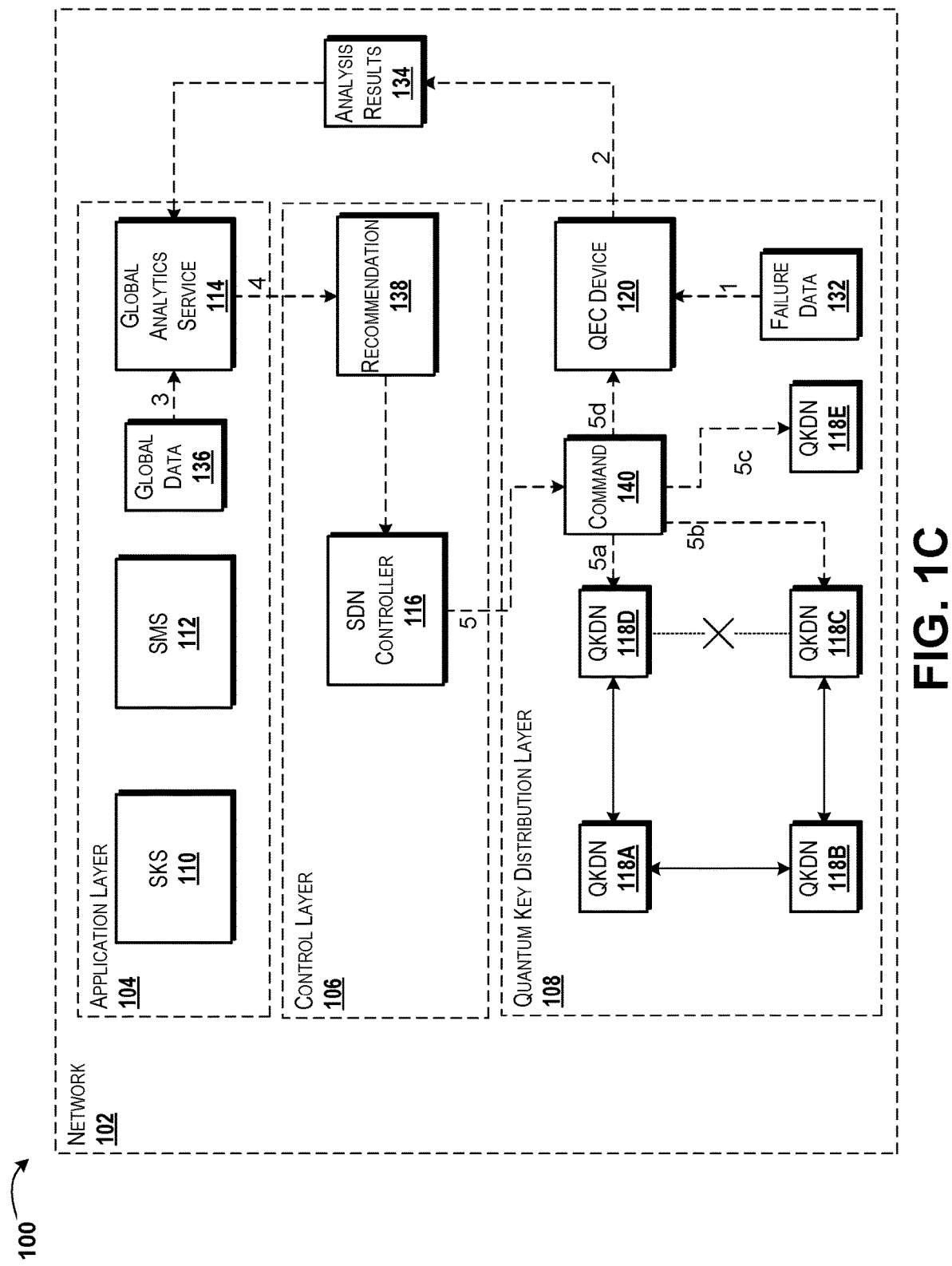
Figure 1D:
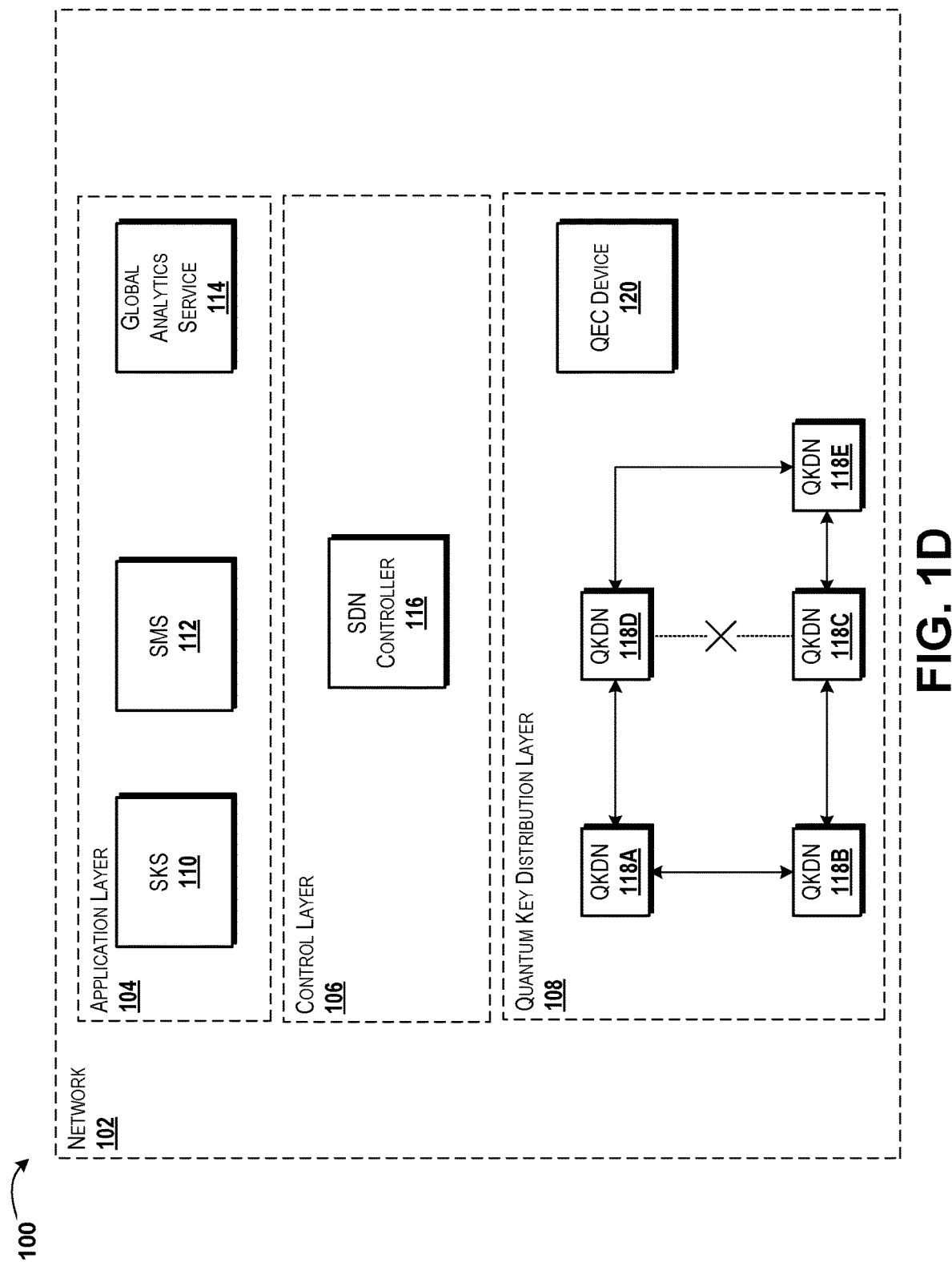

The quantum edge computing device 120 can (e.g., via execution of the monitoring and analysis module 122) detect the failed communication link. In some embodiments of the concepts and technologies disclosed herein, the quantum edge computing device 120 can detect the failure of the communication link substantially instantaneously (e.g., in realtime), though this is not necessarily the case. In some embodiments, as shown in FIG. 1C, the quantum edge computing device 120 can generate and/or obtain failure data 132 upon detecting the failure of the communication link, as indicated by the dashed line labeled "1." The failure data 132 can include statistics of the failed communication link (e.g., usage of the communication link, capacity of the communication link, how long the communication link was used, usage of the communication link at failure time, resources that provided the communication link, etc.).

The failure data 132 also can include security data (e.g., security protocols, authentication requirements, etc.). These and other types of failure data 132 can be obtained and/or generated by the quantum edge computing device 120 from monitoring the quantum key distribution layer 108 and/or can be received, at least in part, from one or more of the quantum key distribution nodes 118 (e.g., self-reporting quantum key distribution nodes 118), and/or from other entities. In some implementations, the quantum edge computing device 120 can be configured to receive messages and/or events from elements of the quantum key distribution layer 108 and therefore can generate the failure data 132 based on these and/or other data. It should be understood that this example is illustrative, and therefore should not be construed as being limiting in any way.

The quantum edge computing device 120 can be configured to maintain a data set that can describe, for one or more (or all) of the quantum key distribution resources of the quantum key distribution layer 108, hot and warm failures and/or security information. This data set therefore can depict not only information about the detected communication link failure, but also other communication links in the quantum key distribution layer 108 and the status of such communication links in terms of security policies and/or protocols, and in terms of failures (e.g., failure expected, failure occurring, security capabilities and/or security status, combinations thereof, or the like). The failure and security data set can be maintained at the edge of the quantum key distribution layer 108, and therefore can be managed and/or stored, in some embodiments, by the quantum edge computing device 120.

The quantum edge computing device 120 can analyze the failure data 132 and the data set to determine a possible replacement communication link for the communication link that has failed. In some embodiments, this analysis by the quantum edge computing device 120 may by definition be limited, as in some embodiments the quantum edge computing device 120 can have an edge view of the quantum key distribution layer 108 and not necessarily a global view of the network 102. Thus, the quantum edge computing device 120 can generate results of the local analysis and output those results as the analysis results 134, as indicated by the dashed line labeled "2." In some embodiments, the analysis results 134 can correspond to a recommended replacement communication link for the failed communication link, as determined based on the local analysis of the quantum edge computing device 120. It should be understood that this example is illustrative, and therefore should not be construed as being limiting in any way.

The quantum edge computing device 120 can be configured to provide the analysis results 134 to the global analytics service 114, as indicated by the dashed line labeled "2." The global analytics service 114 can be configured to analyze the analysis results 134 and/or other information that can take into account global needs and capabilities of the network 102, as well as secret key distribution policies, security policies, combinations thereof, or the like. In particular, the global analytics service 114 can analyze the analysis results 134 received along with global data 136, which can be received and/or otherwise obtained by the global analytics service 114, as indicated by the dashed line labeled "3."

The global data 136 can be obtained by the global analytics service 114 from various entities in the network 102. According to various embodiments of the concepts and technologies disclosed herein, the global data 136 can be obtained from the secret key provisioning service 110 and therefore can include key provisioning policies and/or key provisioning information. The global data 136 also can include security management information, which can be obtained from the security management service 112. The global data 136 also can include availability and/or capacity information obtained from various network monitors operating in one or more levels of the network 102 and/or other information.

The global analytics service 114 can analyze the global data 136 and the analysis results 134 from the quantum edge computing device 120 to determine how to replace the failed communication link based on policies and/or other global considerations. Based on this analysis, the global analytics service 114 can generate a recommendation 138. The recommendation 138 can be based on the analysis of the global data 136 and the analysis results 134. Thus, the recommendation 138 can indicate the contours of a communication link that is needed to replace the failed communication link based on, for example, capacity required for the communication link, security requirements of the communication link, security policies associated with the communication link, and/or other security management concerns and/or key provisioning concerns. Because the recommendation 138 can be based on additional and/or alternative data, it should be understood that this example is illustrative, and therefore should not be construed as being limiting in any way.

The server computer 130 can send the recommendation 138 to the software defined networking controller 116 (or the computing device 128 that hosts the software defined networking controller 116), as indicated by the dashed line labeled "4." The software defined networking controller 116 can be configured to receive and/or otherwise obtain the recommendation 138, as indicated by the dashed line labeled "4." The software defined networking controller 116 also can be configured to analyze the recommendation 138 and to generate one or more commands 140 for replacing the failed communication link.

In particular, the software defined networking controller 116 can analyze the recommendation 138 based on capacities and availabilities of various element of the quantum key distribution layer 108, e.g., by reviewing the network map and/or topology as illustrated and described herein. Because the software defined networking controller 116 can be configured to control and/or allocate the resources of the quantum key distribution layer 108, the software defined networking controller 116 can be capable of determining capacities of each resource in the quantum key distribution layer 108, resource usage of each resource of the quantum key distribution layer 108, and all requirements associated with communication links as known and/or as communicated by the global analytics service 114 and the quantum edge computing device 120.

As such, the software defined networking controller 116 can analyze the recommendation and network topologies and/or resource usage information to determine how to replace the communication link based on input from the global analytics service 114 and, by extension, the quantum edge computing device 120. Thus, the software defined networking controller 116 can bring software defined networking analysis and control functionality to the network 102, and more particularly, to the quantum key distribution layer 108 of the network 102. It should be understood that this example is illustrative, and therefore should not be construed as being limiting in any way.

According to various embodiments of the concepts and technologies disclosed herein, the software defined networking controller 116 can be configured to generate and/or output one or more commands 140 for one or more quantum key distribution resources (e.g., the quantum key distribution nodes 118 and/or the quantum edge computing device 120) of the quantum key distribution layer 108, as indicated by the dashed line labeled "5." The commands 140 generated by the software defined networking controller 116 can instruct one or more of the quantum key distribution nodes 118 how to reroute traffic over a different communication link, and/or can instruct the quantum edge computing device 120 how to replace the communication link (e.g., via orchestrating new quantum key distribution nodes 118, via allocation of new physical connects to replace the communication link that failed, via instructing quantum key distribution nodes 118 to reroute traffic, and/or via other operations). The computing device 128 that hosts the software defined networking controller 116 can send the one or more commands 140 to the one or more quantum key distribution resources (e.g., the quantum key distribution nodes 118 and/or the quantum edge computing device 120) of the quantum key distribution layer 108, as indicated by the dashed lines labeled "5a," "5b," "5c," and "5d."

If the recipient of the one or more commands 140 is the quantum edge computing device 120 (as indicated by the dashed line labeled "5d"), the quantum edge computing device 120 can receive the commands 140 generated by the software defined networking controller 116 and can take an action. In some embodiments, the action can include invoking the orchestration module 124 in response to receiving the command 140. The orchestration module 124 can be configured to change traffic routing in and/or through the quantum key distribution nodes 118, to allocate one or more pre-existing quantum key distribution resources to replace the communication link, and/or to take other actions to mitigate the failed communication link. In some embodiments, the quantum edge computing device 120 can allocate an existing quantum key distribution communication link in the quantum key distribution layer 108 to replace the failed communication link. Because other actions can be taken by the quantum edge computing device 120, it should be understood that these examples are illustrative, and therefore should not be construed as being limiting in any way.

If the recipient of the one or more commands 140 is one or more quantum key distribution nodes 118 (as indicated by the dashed lines labeled "5a," "5b," and "5c"), it can be appreciated that the one or more quantum key distribution nodes can be configured to receive the command 140 from the software defined networking controller 116 and redirect traffic via a new or different communication link. As noted above, the quantum key distribution node 118 may be configured to communicate with other quantum key distribution nodes 118 via other communication links. Thus, the command 140 can inform the quantum key distribution node 118 to redirect traffic intended for the failed communication link to a new communication link existing with other entities on the quantum key distribution layer 108.

In the example illustrated in FIGS. 1A-1D, for example, the quantum key distribution node 118C may redirect traffic intended for the quantum key distribution node 118D along a communication link that may exist between the quantum key distribution node 118C and the quantum key distribution node 118E and another communication link that may exist between the quantum key distribution node 118E and the quantum key distribution node 118D. According to various embodiments of the concepts and technologies disclosed herein, the quantum key distribution node 118E is quantum key distribution capable, but was not previously communicating with the quantum key distribution nodes 118A-D. In one contemplated embodiment, the quantum key distribution node 118E is a satellite link associated with the quantum key distribution layer 108. It should be understood that these examples are illustrative, and therefore should not be construed as being limiting in any way.

Thus, in the example illustrated in FIGS. 1A-1D, the traffic from the quantum key distribution node 118C intended for the quantum key distribution node 118D can be sent via a new communication link between the quantum key distribution node 118C and the quantum key distribution node 118E, as well as another communication link between the quantum key distribution node 118E and the quantum key distribution node 118D instead of the failed communication link. Because other methods of rerouting traffic are possible and are contemplated, it should be understood that this example is illustrative, and therefore should not be construed as being limiting in any way.

According to various embodiments of the concepts and technologies disclosed herein, the concepts and technologies disclosed herein for replacing a failed communication link can be used to help realize several benefits by using an embodiment of the quantum edge computing device 120 illustrated and described herein. First, with quantum hot and warm data kept at the edge, if an outage occurs, recovery can be virtually instant in some implementations, thereby allowing for a recovery time objective ("RTO") and recovery point objective ("RPO") of essential zero. Furthermore, using the software defined networking controller 116 can enable the identification of an alternative communication link over the native network infrastructure or over an alternative network by employing the global network view and analytics offered by the software defined networking controller 116 and the global analytics service 114. It should be understood that this example is illustrative, and therefore should not be construed as being limiting in any way.

In practice, a quantum key distribution network can be provided by quantum key distribution resources of a quantum key distribution layer 108. The quantum key distribution resources can include two or more quantum key distribution nodes 118, communication links between the quantum key distribution nodes 118, and a quantum edge computing device 120. The quantum edge computing device 120 can execute and/or host a monitoring and analysis module 122 and an orchestration module 124. The quantum edge computing device 120 can detect a failure of a communication link. In response to detecting the failure of the communication link, the quantum edge computing device 120 can obtain or generate, and analyze, failure data 132 and one or more data sets describing failures and security status of the quantum key distribution resources of the quantum key distribution layer 108.

The quantum edge computing device 120 can generate analysis results 134 and share the analysis results 134 with a global analytics service 114. The global analytics service 114 can analyze global data (e.g., security policies, key distribution policies, quantum key distribution communication needs, etc.) and generate a recommendation 138 for mitigating the communication link failure. The global analytics service 114 can send the recommendation 138 to the software defined networking controller 116 for additional analysis and/or action. The software defined networking controller 116 can have a global view of the network 102 and/or resources thereof. The software defined networking controller 116 can determine how to mitigate the communication link failure, and generate one or more commands 140 for mitigating the communication link failure. The software defined networking controller 116 can send the one or more commands 140 to one or more of the quantum key distribution resources of the quantum key distribution layer 108 such as, for example, the quantum key distribution nodes 118 and/or the quantum edge computing device 120.

The quantum key distribution resources of the quantum key distribution layer 108 such as, for example, the quantum key distribution nodes 118 and/or the quantum edge computing device 120 can implement the commands 140 to mitigate the communication link failure. If the recipient of the command 140 is the quantum edge computing device 120, the quantum edge computing device 120 can allocate existing quantum key distribution resources to replace the failed communication link, instruct quantum key distribution resources to reroute traffic, and/or take other actions via the orchestration module 124. If the recipient of the command 140 is one or more quantum key distribution node 118, the one or more quantum key distribution nodes 118 can reroute traffic as specified in the commands 140. Thus, the closed loop of the quantum edge computing device 120, the global analytics service 114, and the software defined networking controller 116, can be configured to mitigate a failed communication link.

FIG. 1 illustrates one network 102, five quantum key distribution nodes 118, one quantum edge computing device 120, one computing device 128, and one server computer 130. It should be understood, however, that various implementations of the operating environment 100 can include zero, one, or more than one network 102; two or more than two quantum key distribution nodes 118; one or more than one quantum edge computing device 120; zero, one, or more than one computing device 128; and/or zero, one, or more than one server computer 130. As such, the illustrated embodiment should be understood as being illustrative, and should not be construed as being limiting in any way.

Figure 2:
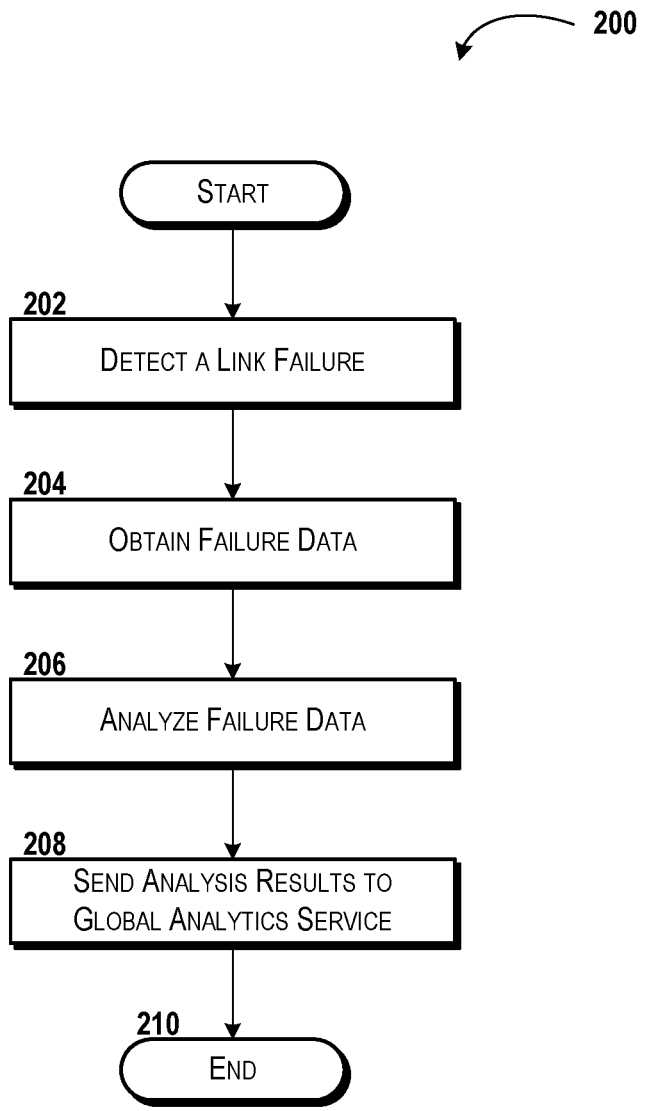
FIG. 2 is a flow diagram showing aspects of a method for detecting a communication link failure in a quantum key distribution network, according to an illustrative embodiment of the concepts and technologies described herein.

Turning now to FIG. 2, aspects of a method 200 for detecting a communication link failure in a quantum key distribution network will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the quantum edge computing device 120, the computing device 128, or the server computer 130, to perform one or more operations and/or causing the processor to direct other components of the computing system or device to perform one or more of the operations.

For purposes of illustrating and describing the concepts of the present disclosure, the method 200 is described herein as being performed by the quantum edge computing device 120 via execution of one or more software modules such as, for example, the monitoring and analysis module 122. It should be understood that additional and/or alternative devices and/or network nodes can provide the functionality described herein via execution of one or more modules, applications, and/or other software including, but not limited to, the monitoring and analysis module 122. Thus, the illustrated embodiments are illustrative, and should not be viewed as being limiting in any way.

The method 200 begins at operation 202. At operation 202, the quantum edge computing device 120 can detect a communication link failure, where the communication link failure can correspond to a failure of a communication link between two quantum key distribution nodes 118. In the example shown in FIGS. 1A-1D, the communication link between quantum key distribution nodes 118C and 118D fails. It should be understood that this example is illustrative, and therefore should not be construed as being limiting in any way.

It should be appreciated that the communication links between the quantum key distribution nodes 118 can correspond to point-to-point connections in a physical layer of the network, namely the quantum key distribution layer 108. Thus, these communication links can enable communication between the quantum key distribution nodes 118 using light, sometimes divided into multiple wavelengths and/or time slices (e.g., by employing wavelength division multiplexing ("WDM"), or other technologies) as generally is understood. Because of the physical hardware involved in providing such communication links, however, it can be appreciated that a communication link failure can require significant time and/or resources to replace in quantum key distribution networks. As explained above, however, embodiments of the concepts and technologies disclosed herein can be used to provide for replacement resource allocation in a global manner using a unified control plane, which may provide a benefit of shortening the time required for replacement of the failed communication link, in some embodiments. It should be understood that this example is illustrative, and therefore should not be construed as being limiting in any way.

From operation 202, the method 200 can proceed to operation 204. At operation 204, the quantum edge computing device 120 can collect (or otherwise obtain) failure data 132 from the quantum key distribution layer 108. As explained above, the failure data 132 can include statistics of the failed communication link (e.g., usage of the communication link, capacity of the communication link, how long the communication link was used, usage of the communication link at failure time, etc.) and security data (e.g., security protocols, authentication requirements, etc.). These and other types of failure data 132 can be obtained by the quantum edge computing device 120 from the quantum key distribution nodes 118 (e.g., self-reporting quantum key distribution nodes 118), and/or from other entities.

In various embodiments of the concepts and technologies disclosed herein, the quantum edge computing device 120 can collect the failure data 132 as the quantum edge computing device 120 can be the edge computing device for the quantum key distribution layer 108. More particularly, as the edge computing device for the quantum key distribution layer 108, the quantum edge computing device 120 can receive messages and/or events from elements of the quantum key distribution layer 108 for reporting to the global analytics service 114 and/or other devices. Thus, although not separately shown in FIGS. 1A-1D, it can be appreciated that the quantum key distribution resources of the quantum key distribution layer 108 can send messages and/or events to the quantum edge computing device 120. As such, in some embodiments of the concepts and technologies disclosed herein, the quantum edge computing device 120 may not be required to obtain the failure data 132, as the failure data 132 may instead be generated by the quantum edge computing device 120 based on events, messages, and/or other information. It should be understood that this example is illustrative, and therefore should not be construed as being limiting in any way.

In some embodiments, the failure data 132 also can include a data set that can describe, for the quantum key distribution layer 108, hot and warm failures and/or security information. This data set therefore can define, for one or more (or even all) entities in the quantum key distribution layer 108, any warm failures, hot failures, and/or security issues. Thus, the failure data 132 can depict not only information about the detected communication link failure, but also information about other communication links in the quantum key distribution layer 108 and their statuses in terms of security and in terms of failures (e.g., failure expected, failure occurring, security capabilities and/or security status, combinations thereof, or the like). The failure and security data set can be maintained at the edge of the quantum key distribution layer 108, and therefore can be managed and/or stored, in some embodiments, by the quantum edge computing device 120. Regardless of the source of the failure data 132, the quantum edge computing device 120 can collect, receive, or otherwise obtain the failure data 132 in operation 204.

From operation 204, the method 200 can proceed to operation 206. At operation 206, the quantum edge computing device 120 can analyze the failure data 132 to determine a possible replacement communication link for the communication link that has failed (as detected in operation 202). Operation 206 also can include the quantum edge computing device 120 generating the analysis results 134, which can correspond to a recommended replacement communication link for the failed communication link, based on the local analysis of the quantum edge computing device 120. It should be understood that this example is illustrative, and therefore should not be construed as being limiting in any way.

From operation 206, the method 200 can proceed to operation 208. At operation 208, the quantum edge computing device 120 can send the analysis results 134 to the global analytics service 114. In some embodiments of the concepts and technologies disclosed herein, the quantum edge computing device 120 can communicate with the global analytics service 114 via a dedicated in-band or dedicated out-of-band connection that can be supported by the network 102 using various technologies. The global analytics service 114 can analyze the analysis results 134 in view of additional and/or alternative information, as will be explained with reference to FIG. 3 below.

From operation 208, the method 200 can proceed to operation 210. The method 200 can end at operation 210.

Figure 3:
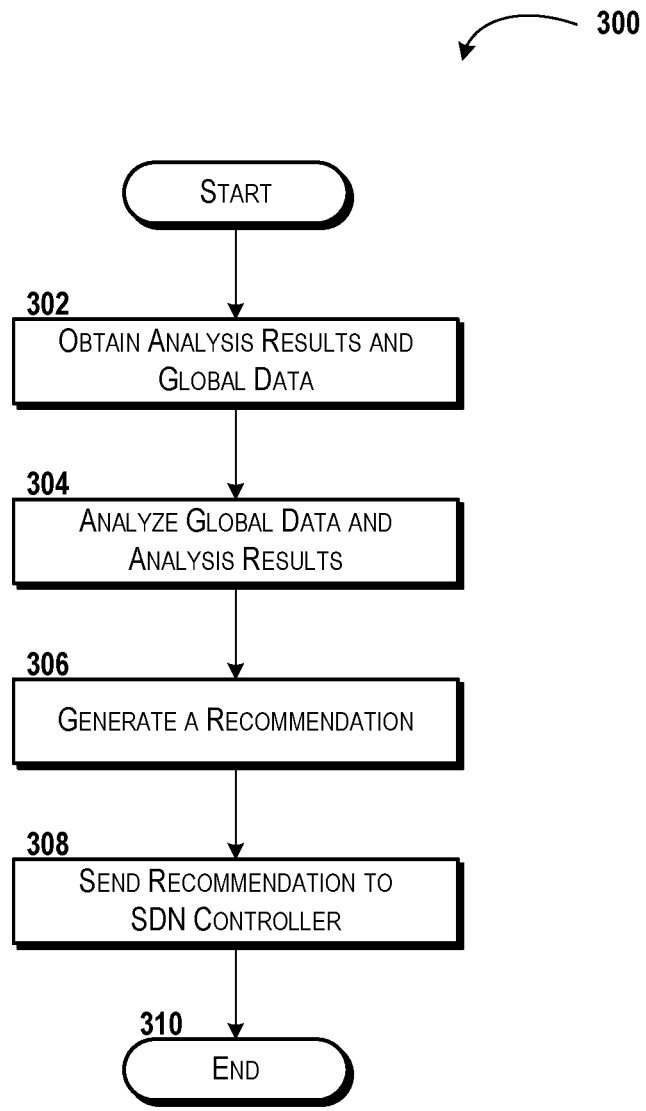
FIG. 3 is a flow diagram showing aspects of a method for generating a recommendation to address a communication link failure in a quantum key distribution network, according to an illustrative embodiment of the concepts and technologies described herein.

Turning now to FIG. 3, aspects of a method 300 for generating a recommendation 138 to address a communication link failure in a quantum key distribution network will be described in detail, according to an illustrative embodiment. For purposes of illustrating and describing the concepts of the present disclosure, the method 300 is described herein as being performed by the server computer 130 via execution of one or more software modules such as, for example, the global analytics service 114. It should be understood that additional and/or alternative devices and/or network nodes can provide the functionality described herein via execution of one or more modules, applications, and/or other software including, but not limited to, the global analytics service 114. Thus, the illustrated embodiments are illustrative, and should not be viewed as being limiting in any way.

The method 300 begins at operation 302. At operation 302, the server computer 130 can receive or otherwise obtain the analysis results 134 from the quantum edge computing device 120. As noted above, the analysis results 134 can represent the perspective of quantum edge computing device 120, and therefore can specify the failed communication link and capabilities lost with failure of the communication link, etc. The server computer 130 can be configured to analyze the analysis results 134 and/or other information that can take into account global needs and capabilities of the network 102.

From operation 302, the method 300 can proceed to operation 304. At operation 304, the server computer 130 can analyze the analysis results 134 received in operation 302 and global data 136. The global data 136 can be obtained by the global analytics service 114 from various entities in the network 102. According to various embodiments of the concepts and technologies disclosed herein, the global data 136 can be obtained from various entities in the network 102 including, but not limited to, key provisioning information obtained from the secret key provisioning service 110, security management information obtained from the security management service 112, availability and/or capacity information obtained from various network monitors operating in one or more levels of the network 102, combinations thereof, or the like.

In operation 304, the server computer 130 can analyze these and/or other information to determine how to replace the failed communication link. According to various embodiments of the concepts and technologies disclosed herein, as noted above, the global data 136 can include secret key provisioning policies and/or secret key provisioning information, security management information, availability and/or capacity information obtained from various network monitors operating in one or more levels of the network 102 and/or other information.

From operation 304, the method 300 can proceed to operation 306. At operation 306, the server computer 130 can generate a recommendation 138. The recommendation 138 can be based on the analysis of the global data 136 and the analysis results 134. Thus, the recommendation 138 can indicate the contours of a communication link that is needed to replace the failed communication link based on, for example, capacity required for the communication link, security requirements of the communication link, security policies associated with the communication link, and/or other security management concerns and/or key provisioning concerns. Because the recommendation 138 can be based on additional and/or alternative data, it should be understood that this example is illustrative, and therefore should not be construed as being limiting in any way.

From operation 306, the method 300 can proceed to operation 308. At operation 308, the server computer 130 can send the recommendation 138 generated in operation 306 to the software defined networking controller 116. According to various embodiments of the concepts and technologies disclosed herein, the recommendation 138 can be sent to the software defined networking controller 116 via a southbound interface of the global analytics service 114. The software defined networking controller 116 can be configured to analyze the recommendation 138 and to generate one or more commands 140 for replacing the failed communication link, as will be explained in more detail below with reference to FIG. 4.

From operation 308, the method 300 can proceed to operation 310. The method 300 can end at operation 310.

Figure 4:
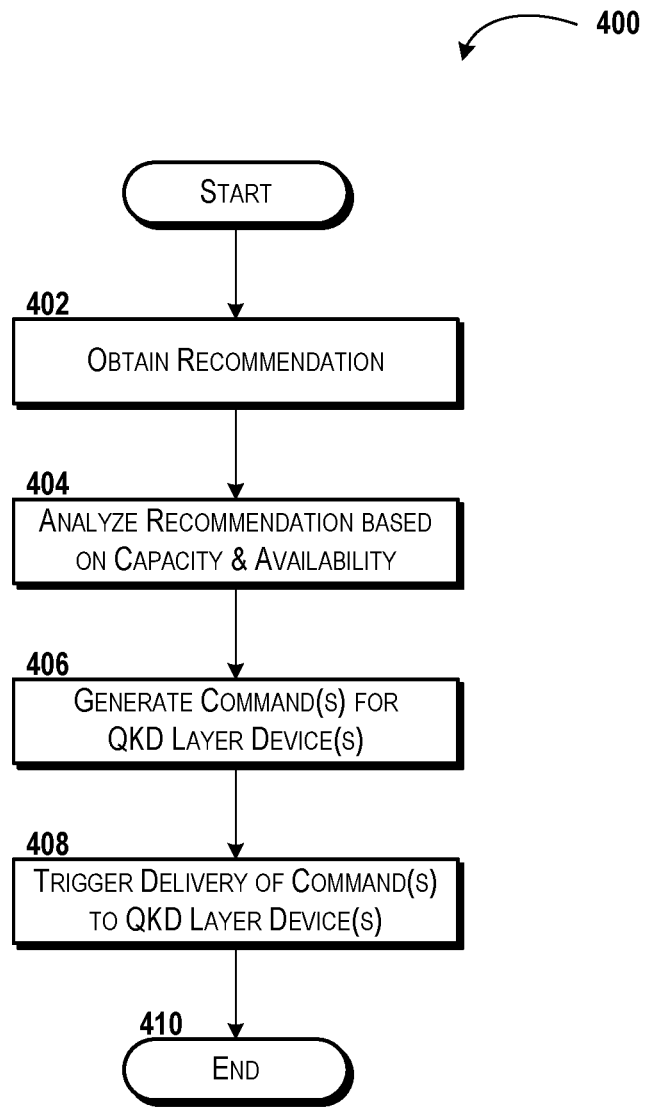
FIG. 4 is a flow diagram showing aspects of a method for generating a command to address a communication link failure in a quantum key distribution network, according to an illustrative embodiment of the concepts and technologies described herein.

Turning now to FIG. 4, aspects of a method 400 for generating a command 140 to address a communication link failure in a quantum key distribution network will be described in detail, according to an illustrative embodiment. For purposes of illustrating and describing the concepts of the present disclosure, the method 400 is described herein as being performed by the computing device 128 via execution of one or more software modules such as, for example, the software defined networking controller 116. It should be understood that additional and/or alternative devices and/or network nodes can provide the functionality described herein via execution of one or more modules, applications, and/or other software including, but not limited to, the software defined networking controller 116. Thus, the illustrated embodiments are illustrative, and should not be viewed as being limiting in any way.

The method 400 begins at operation 402. At operation 402, the computing device 128 can receive or otherwise obtain the recommendation 138 from the global analytics service 114. As noted above, the recommendation 138 can indicate the contours of a communication link that is needed to replace the failed communication link based on, for example, capacity required for the communication link, security requirements of the communication link, security policies associated with the communication link, and/or other security management concerns and/or key provisioning concerns, all from the perspective of the global analytics service 114, which also can consider the perspective of the quantum edge computing device 120, as noted above.

From operation 402, the method 400 can proceed to operation 404. At operation 404, the computing device 128 can analyze the recommendation 138 based on capacities and availabilities of various element of the quantum key distribution layer 108. Because the software defined networking controller 116 can be configured to control and/or allocate the resources of the quantum key distribution layer 108, the software defined networking controller 116 can be capable of determining capacities of each resource in the quantum key distribution layer 108, resource usage of each resource of the quantum key distribution layer 108, and all requirements associated with communication links as known and/or as communicated by the global analytics service 114 and the quantum edge computing device 120. Thus, the computing device 128 can analyze the recommendation and network topologies and/or resource usage information to determine how to replace the communication link based on input from the global analytics service 114 and, by extension, the quantum edge computing device 120. It should be understood that this example is illustrative, and therefore should not be construed as being limiting in any way.

From operation 404, the method 400 can proceed to operation 406. At operation 406, the computing device 128 can generate one or more commands 140 for one or more devices of the quantum key distribution layer 108. The commands 140 generated in operation 406 can instruct one or more of the quantum key distribution nodes 118 how to reroute traffic over a different communication link, in some embodiments. In some other embodiments, the commands 140 generated in operation 406 can instruct the quantum edge computing device 120 how to replace the communication link (e.g., via orchestrating new quantum key distribution nodes 118, via allocation of new physical connects to replace the communication link that failed, via instructing quantum key distribution nodes 118 to reroute traffic, and/or via other operations). Because the commands 140 can include other types of instructions for mitigating the effects of the failed communication link, it should be understood that these examples are illustrative, and therefore should not be construed as being limiting in any way.

From operation 406, the method 400 can proceed to operation 408. At operation 408, the computing device 128 can send the one or more commands 140 generated in operation 406 to one or more device of the quantum key distribution layer 108. Thus, operation 408 can include the computing device 128 sending one or more of the commands 140 to one or more quantum key distribution nodes 118, the quantum edge computing device 120, and/or other elements of the quantum key distribution layer 108. The devices of the quantum key distribution layer 108 can execute the commands 140 to effectively replace the failed communication link, as will be explained below with reference to FIGS. 5 and 6.

From operation 408, the method 400 can proceed to operation 410. The method 400 can end at operation 410.

Figure 5:
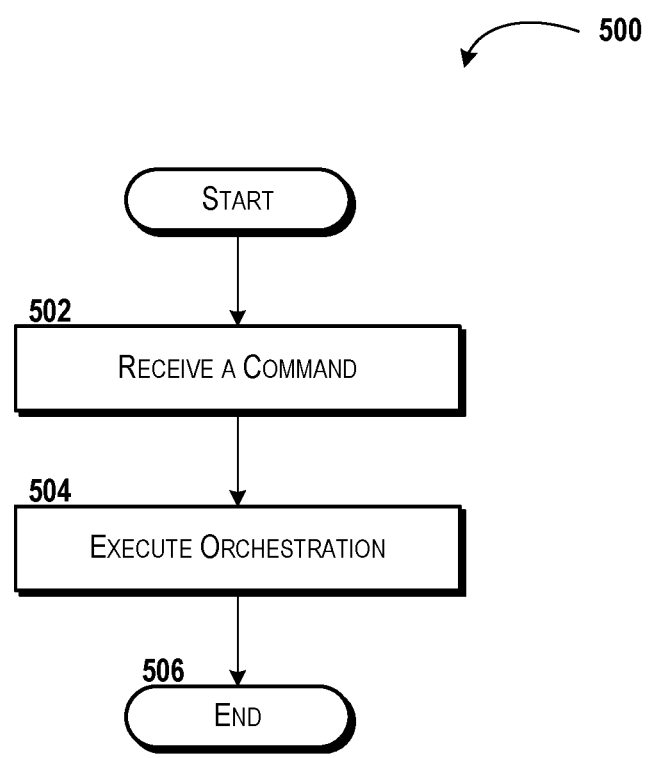
FIG. 5 is a flow diagram showing aspects of a method for executing a command to address a communication link failure in a quantum key distribution network, according to another illustrative embodiment of the concepts and technologies described herein.

Turning now to FIG. 5, aspects of a method 500 for executing a command 140 to address a communication link failure in a quantum key distribution network will be described in detail, according to another illustrative embodiment. For purposes of illustrating and describing the concepts of the present disclosure, the method 500 is described herein as being performed by the quantum edge computing device 120 via execution of one or more software modules such as, for example, the orchestration module 124. It should be understood that additional and/or alternative devices and/or network nodes can provide the functionality described herein via execution of one or more modules, applications, and/or other software including, but not limited to, the orchestration module 124. Thus, the illustrated embodiments are illustrative, and should not be viewed as being limiting in any way.

The method 500 begins at operation 502. At operation 502, the quantum edge computing device 120 can receive a command 140. As explained above, the quantum edge computing device 120 can receive the commands 140 generated by the software defined networking controller 116, in some embodiments. It should be understood that this example is illustrative, and therefore should not be construed as being limiting in any way.

From operation 502, the method 500 can proceed to operation 504. At operation 504, the quantum edge computing device 120 can execute orchestration. In particular, the quantum edge computing device 120 can orchestrate one or more devices and/or allocate one or more resources to replace the failed communication link in operation 504. In some embodiments, for example, the quantum edge computing device 120 can allocate an existing quantum key distribution communication link in the quantum key distribution layer 108 to replace the failed communication link.

As shown in the example illustrated in FIGS. 1A-1D, for example, the quantum edge computing device 120 can allocate a communication link between the quantum key distribution node 118C and the quantum key distribution node 118E, as well as a second communication link between the quantum key distribution node 118E and the quantum key distribution node 118D to replace the failed node between the quantum key distribution node 118C and the quantum key distribution node 118D. Of course, this example is merely illustrative of the concepts and technologies disclosed herein, which can allocate existing resources (e.g., quantum key distribution nodes 118, quantum key distribution communication links, etc.) of the quantum key distribution layer 108 to replace failed quantum key distribution resources. Thus, it should be understood that this example is illustrative, and therefore should not be construed as being limiting in any way.

From operation 504, the method 500 can proceed to operation 506. The method 500 can end at operation 506.

Figure 6:
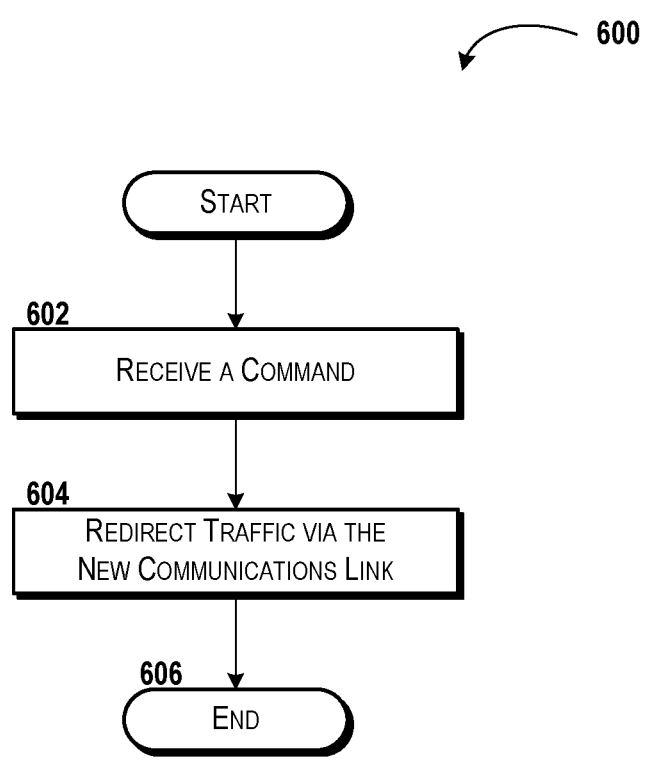
FIG. 6 is a flow diagram showing aspects of a method for executing a command to address a communication link failure in a quantum key distribution network, according to an illustrative embodiment of the concepts and technologies described herein.

Turning now to FIG. 6, aspects of a method 600 for executing a command 140 to address a communication link failure in a quantum key distribution network will be described in detail, according to an illustrative embodiment. For purposes of illustrating and describing the concepts of the present disclosure, the method 600 is described herein as being performed by one of the quantum key distribution nodes 118 via execution of one or more software modules such as, for example, the control application 126. It should be understood that additional and/or alternative devices and/or network nodes can provide the functionality described herein via execution of one or more modules, applications, and/or other software including, but not limited to, the control application 126. Thus, the illustrated embodiments are illustrative, and should not be viewed as being limiting in any way.

The method 600 begins at operation 602. At operation 602, the quantum key distribution node 118 can receive a command 140 from the software defined networking controller 116. As explained above, the quantum key distribution node 118 can receive the commands 140 generated by the software defined networking controller 116, in some embodiments, while in other embodiments, the quantum edge computing device 120 can receive the commands 140 (as illustrated and described with reference to FIG. 5). It should be understood that more than one quantum key distribution node 118 can receive the command 140, and therefore the illustrated embodiment is illustrative and should not be construed as being limiting in any way.

From operation 602, the method 600 can proceed to operation 604. At operation 604, the quantum key distribution node 118 can redirect traffic via a new communication link. As noted above, the quantum key distribution node 118 may be configured to communicate with other quantum key distribution nodes 118 via other communication links. Thus, the command 140 can inform the quantum key distribution node 118 to redirect and/or reroute traffic intended to be sent via the failed communication link to a new communication link existing with other entities on the quantum key distribution layer 108. Isbu.

In the example illustrated in FIGS. 1A-1D, for example, the quantum key distribution node 118C may redirect traffic intended for the quantum key distribution node 118D along a communication link that exists between the quantum key distribution node 118C and the quantum key distribution node 118E, as well as a second communication link between the quantum key distribution node 118E and the quantum key distribution node 118D. Thus, the traffic for the quantum key distribution node 118D can be sent via this communication link instead of the failed communication link. It should be understood that this example is illustrative, and therefore should not be construed as being limiting in any way.

From operation 604, the method 600 can proceed to operation 606. The method 600 can end at operation 606.

Figure 7:
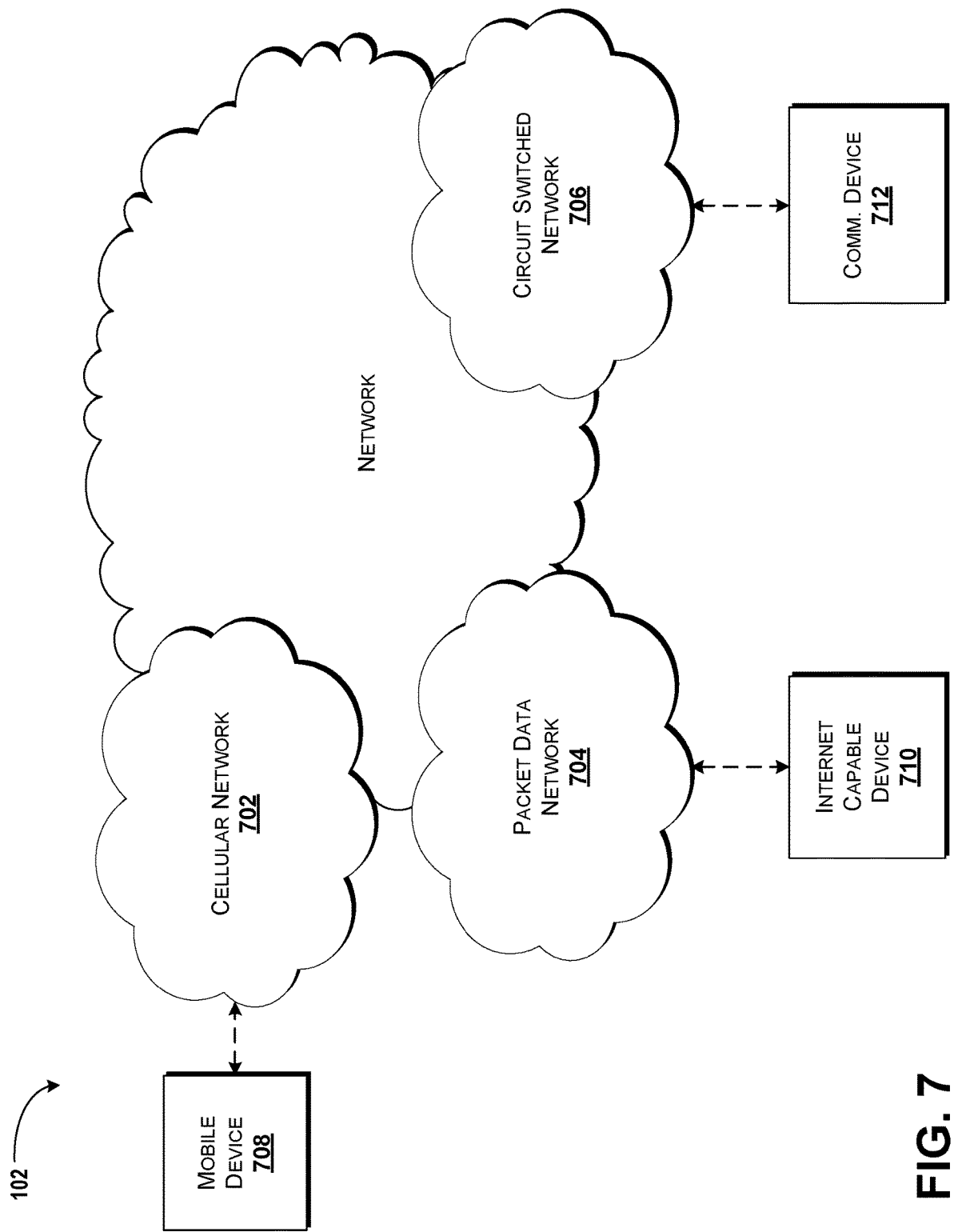
FIG. 7 schematically illustrates a network, according to an illustrative embodiment of the concepts and technologies described herein.

Turning now to FIG. 7, additional details of the network 102 are illustrated, according to an illustrative embodiment. The network 102 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSDPA), and HSPA+. The cellular network 702 also is compatible with 4G, 4.5G, and 5G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 102 is used to refer broadly to any combination of the networks 702, 704, 706. It should be appreciated that substantially all of the functionality described with reference to the network 102 can be performed by the cellular network 702, the packet data network 704, and/or the circuit switched network 706, alone or in combination with other networks, network elements, and the like.

Figure 8:
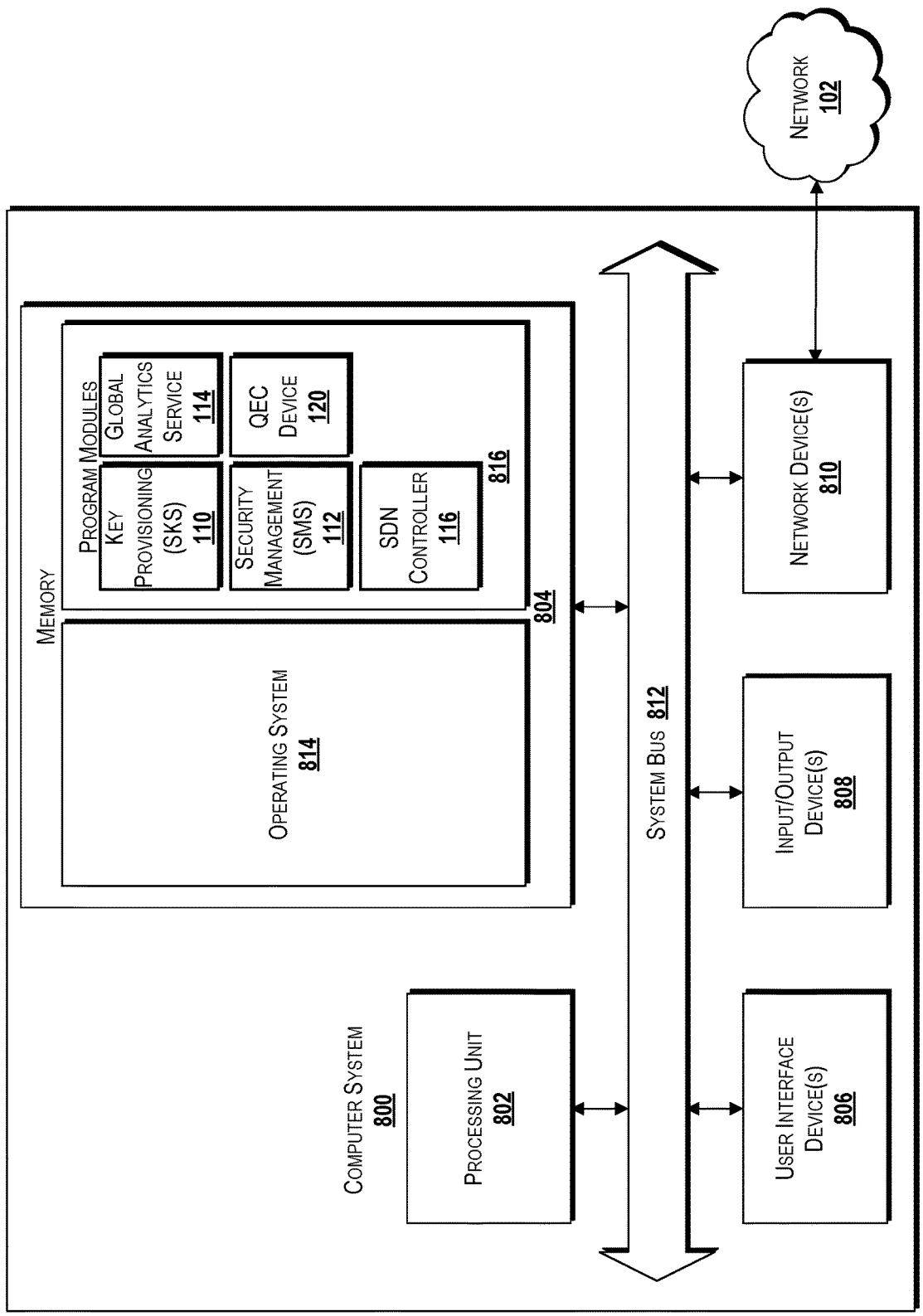
FIG. 8 is a block diagram illustrating an example computer system configured to provide quantum key distribution network security survivability, according to some illustrative embodiments of the concepts and technologies described herein.

FIG. 8 is a block diagram illustrating a computer system 800 configured to provide the functionality described herein for quantum key distribution network security survivability, in accordance with various embodiments of the concepts and technologies disclosed herein. Thus, the computer system 800 can be used to provide the functionality associated with the quantum edge computing device 120, the computing device 128, and/or the server computer 130. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the secret key provisioning service 110, the security management service 112, the global analytics service 114, the software defined networking controller 116, the QEC device 120, the monitoring and analysis module 122, the orchestration module 124, and/or the control application 126. These and/or other programs can be embodied in computer-readable media containing instructions that, when executed by the processing unit 802, perform one or more of the methods 200, 300, 400, 500, and/or 600 described in detail above with respect to FIGS. 2-6 and/or other functionality as illustrated and described herein. It can be appreciated that, at least by virtue of the instructions embodying the methods 200, 300, 400, 500, and 600, and/or other functionality illustrated and described herein being stored in the memory 804 and/or accessed and/or executed by the processing unit 802, the computer system 800 is a special-purpose computing system that can facilitate providing the functionality illustrated and described herein. According to embodiments, the program modules 816 may be embodied in hardware, software, firmware, or any combination thereof. Although not shown in FIG. 8, it should be understood that the memory 804 also can be configured to store the failure data 132, the analysis results 134, the global data 136, the recommendation 138, the commands 140, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 102. Examples of the network devices 810 include, but are not limited to, a modem, a radio frequency ("RF") or infrared ("IR") transceiver, a telephonic interface, a bridge, a router, or a network card. The network 102 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 102 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
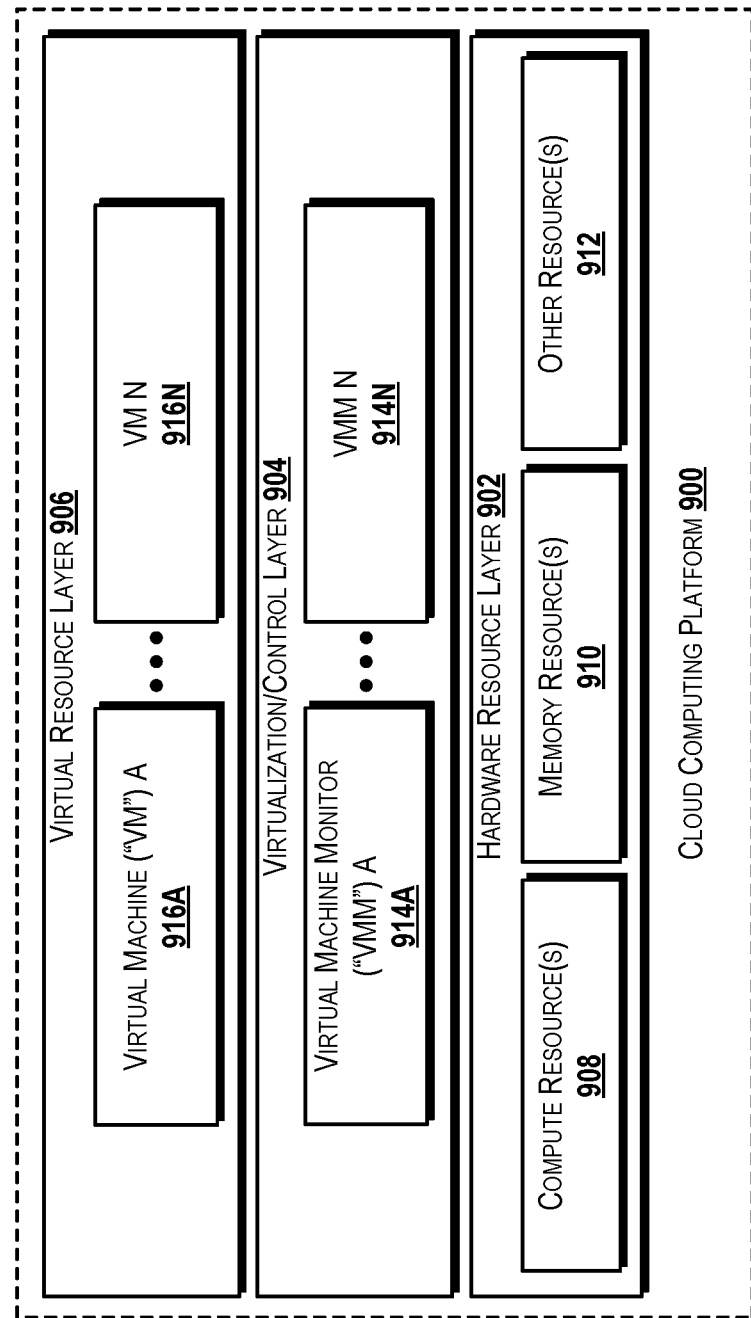
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for quantum key distribution network security survivability and/or for interacting with the secret key provisioning service 110, the security management service 112, the global analytics service 114, the software defined networking controller 116, the quantum key distribution nodes 118, the monitoring and analysis module 122, the orchestration module 124, and/or the control application 126. Thus, it can be appreciated that in some embodiments of the concepts and technologies disclosed herein, the cloud computing platform 900 illustrated in FIG. 9 can be used to provide the functionality described herein with respect to the quantum edge computing device 120, the computing device 128, and/or the server computer 130.

The cloud computing platform 900 thus may be utilized to execute any aspects of the software components presented herein. Thus, according to various embodiments of the concepts and technologies disclosed herein, the secret key provisioning service 110, the security management service 112, the global analytics service 114, the software defined networking controller 116, the quantum key distribution nodes 118, the monitoring and analysis module 122, the orchestration module 124, and/or the control application 126 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 102 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the secret key provisioning service 110, the security management service 112, the global analytics service 114, the software defined networking controller 116, the quantum key distribution nodes 118, the monitoring and analysis module 122, the orchestration module 124, and/or the control application 126 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that the SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, Calif., and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the secret key provisioning service 110, the security management service 112, the global analytics service 114, the software defined networking controller 116, the quantum key distribution nodes 118, the monitoring and analysis module 122, the orchestration module 124, and/or the control application 126 or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the failure data 132, the analysis results 134, the global data 136, the recommendation 138, the commands 140, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for quantum key distribution network security survivability have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
receiving, at a software defined networking controller operating in a control layer of a network, a recommendation from a global analytics service operating in an application layer of the network, wherein the recommendation recommends replacing a failed communication link in a quantum key distribution layer of the network, and wherein the failed communication link is detected by a quantum edge computing device operating in the quantum key distribution layer of the network,
generating, by the software defined networking controller and based on the recommendation and a network topology, a command that, when received by a quantum key distribution resource of the quantum key distribution layer of the network, causes the quantum key distribution resource to perform an action to mitigate impact from the failed communication link, and
sending, to the quantum key distribution resource, the command, wherein the quantum key distribution resource performs the action to mitigate the impact from the failed communication link.

2. The system of claim 1, wherein a closed loop to enable mitigation of the impact from the failed communication link comprises the software defined networking controller, the quantum edge computing device, and the global analytics service.

3. The system of claim 1, wherein the failed communication link comprises a communication link between a first quantum key distribution node and a second quantum key distribution node.

4. The system of claim 3, wherein the quantum key distribution resource comprises the quantum edge computing device, and wherein the action to mitigate the impact from the failed communication link comprises allocating a new communication link between the first quantum key distribution node and the second quantum key distribution node.

5. The system of claim 3, wherein the quantum key distribution resource comprises the first quantum key distribution node, and wherein the action to mitigate the impact from the failed communication link comprises rerouting traffic from the failed communication link to a new communication link between the first quantum key distribution node and the second quantum key distribution node.

6. The system of claim 5, wherein the new communication link comprises a satellite link.

7. The system of claim 1, wherein the recommendation is generated by the global analytics service based on local analysis results generated by the quantum edge computing device, wherein the quantum edge computing device operates at an edge of the quantum key distribution layer of the network and accesses a data set describing failures and security status of quantum key distribution resources of the quantum key distribution layer of the network.

8. The system of claim 1, further comprising:
a first direct interface between the quantum edge computing device and the software defined networking controller; and
a second direct interface between the global analytics service and the software defined networking controller, wherein a closed loop to enable mitigation of the impact from the failed communication link comprises the software defined networking controller, the first direct interface, the quantum edge computing device, the second direct interface, and the global analytics service.

9. A method comprising:
receiving, at a software defined networking controller operating in a control layer of a network, a recommendation from a global analytics service operating in an application layer of the network, wherein the recommendation recommends replacing a failed communication link in a quantum key distribution layer of the network, and wherein the failed communication link is detected by a quantum edge computing device operating in the quantum key distribution layer of the network;
generating, by the software defined networking controller and based on the recommendation and a network topology, a command that, when received by a quantum key distribution resource of the quantum key distribution layer of the network, causes the quantum key distribution resource to perform an action to mitigate impact from the failed communication link; and
sending, to the quantum key distribution resource, the command, wherein the quantum key distribution resource performs the action to mitigate the impact from the failed communication link.

10. The method of claim 9, wherein the failed communication link comprises a communication link between a first quantum key distribution node and a second quantum key distribution node.

11. The method of claim 10, wherein the quantum key distribution resource comprises the quantum edge computing device, and wherein the action to mitigate the impact from the failed communication link comprises allocating a new communication link between the first quantum key distribution node and the second quantum key distribution node.

12. The method of claim 10, wherein the quantum key distribution resource comprises the first quantum key distribution node, and wherein the action to mitigate the impact from the failed communication link comprises rerouting traffic from the failed communication link to a new communication link between the first quantum key distribution node and the second quantum key distribution node.

13. The method of claim 9, wherein the recommendation is generated by the global analytics service based on local analysis results generated by the quantum edge computing device, wherein the quantum edge computing device operates at an edge of the quantum key distribution layer of the network and accesses a data set describing failures and security status of quantum key distribution resources of the quantum key distribution layer of the network.

14. The method of claim 9, wherein a closed loop to enable mitigation of the impact from the failed communication link comprises the quantum edge computing device, a first interface between the quantum edge computing device and the global analytics service, a second interface between the global analytics service and the software defined networking controller, and a third interface between the software defined networking controller and the quantum edge computing device, wherein the second interface comprises a first direct interface, and wherein the third interface comprises a second direct interface.

15. The method of claim 9, wherein the recommendation is generated by the global analytics service based on local analysis results generated by the quantum edge computing device, wherein the quantum edge computing device operates at an edge of the quantum key distribution layer of the network and accesses a data set describing failures and security status of quantum key distribution resources of the quantum key distribution layer of the network.

16. A computer storage medium having computer-executable instructions stored thereon that, when executed by a processor, cause the processor to perform operations comprising:
receiving, at a software defined networking controller operating in a control layer of a network, a recommendation from a global analytics service operating in an application layer of the network, wherein the recommendation recommends replacing a failed communication link in a quantum key distribution layer of the network, and wherein the failed communication link is detected by a quantum edge computing device operating in the quantum key distribution layer of the network;
generating, by the software defined networking controller and based on the recommendation and a network topology, a command that, when received by a quantum key distribution resource of the quantum key distribution layer of the network, causes the quantum key distribution resource to perform an action to mitigate impact from the failed communication link; and
sending, to the quantum key distribution resource, the command, wherein the quantum key distribution resource performs the action to mitigate the impact from the failed communication link.

17. The computer storage medium of claim 16, wherein a closed loop to enable mitigation of the impact from the failed communication link comprises the software defined networking controller, the quantum edge computing device, and the global analytics service.

18. The computer storage medium of claim 16, wherein the failed communication link comprises a communication link between a first quantum key distribution node and a second quantum key distribution node, wherein the quantum key distribution resource comprises the quantum edge computing device, and wherein the action to mitigate the impact from the failed communication link comprises allocating a new communication link between the first quantum key distribution node and the second quantum key distribution node.

19. The computer storage medium of claim 16, wherein the failed communication link comprises a communication link between a first quantum key distribution node and a second quantum key distribution node, wherein the quantum key distribution resource comprises the first quantum key distribution node, and wherein the action to mitigate the impact from the failed communication link comprises rerouting traffic from the failed communication link to a new communication link between the first quantum key distribution node and the second quantum key distribution node.

20. The computer storage medium of claim 16, wherein a closed loop to enable mitigation of the impact from the failed communication link comprises the quantum edge computing device, a first interface between the quantum edge computing device and the global analytics service, a second interface between the global analytics service and the software defined networking controller, and a third interface between the software defined networking controller and the quantum edge computing device, wherein the second interface comprises a first direct interface, and wherein the third interface comprises a second direct interface.

\* \* \* \* \*